March 8, 1955 M. WAGNER 2,703,708
WHEEL SUSPENSION, PARTICULARLY FOR MOTOR VEHICLES
Filed Sept. 13, 1949 2 Sheets-Sheet 1

INVENTOR.
Max Wagner

United States Patent Office
2,703,708
Patented Mar. 8, 1955

2,703,708
WHEEL SUSPENSION, PARTICULARLY FOR MOTOR VEHICLES

Max Wagner, Stuttgart, Germany, assignor to Daimler-Benz Aktiengesellschaft, Stuttgart-Unterturkheim, Germany Application September 13, 1949, Serial No. 115,401

Claims priority, application Germany October 1, 1948

9 Claims. (Cl. 267—20)

This invention relates to a wheel suspension of vehicles and more particularly, to a wheel suspension adapted for use in motor vehicles, in which the guide members of the wheel, preferably including two swinging arms, arranged one above the other, are suspended by a helical or similar spring.

It is, accordingly, an object of the present invention to provide a wheel suspension for vehicles which is compact and which permits easy installation and removal of the shock absorber.

A further object of the present invention is to provide a wheel suspension for vehicles having a coil spring and a shock absorber coaxially mounted within the spring wherein the shock absorber may be installed and removed independently of the spring.

A further object of the present invention resides in the provision of a wheel suspension including guide members, a helical spring between the guide members and a shock absorber coaxially mounted within the helical spring wherein the wheel suspension is yieldably mounted so as to yield in a horizontal direction.

A still further object of the present invention is the provision of a wheel suspension in which the spring and shock absorber assembly is either wholly or partially yieldable in the horizontal direction with the yieldable wheel suspension.

Thus, generally speaking, one feature of the present invention resides in the provision of a construction which is such that the aforementioned spring and associated shock absorber, for example, a hydraulic shock absorber, especially of the telescopic type, which is located inside the spring are allowed to yield in the horizontal direction either wholly or at least partially around a vertical axis together with the wheel suspension.

This may be achieved by an arrangement wherein the shock absorber is located within the spring and wherein the spring and shock absorber are connected at both ends thereof to the wheel suspension which is constructed to yield in horizontal direction. The spring and shock absorber may be connected, for example, with the upper ends thereof to the supporting member or to the upper guide member and with the lower ends thereof to the lower guide member or to a part connected thereto, for example, to the lower spring plate. Preferably the supporting member of the wheel suspension is a trunnion connected resiliently to the superstructure, frame or body of the vehicle about its vertical axis. The upper ends of the spring and shock absorber may be connected to a joining member of the upper guide member which is rigidly connected to the trunnion, while the connection of the guide members to the trunnion are such as to permit up and down movement of the guide members with respect to the trunnion. The connection of the guide members to the supporting trunnion may be a direct or an indirect one, for example, by the intermediary of a cross member of the trunnion. In all these embodiments the entire assembly of spring and shock absorber participates in the movement around the vertical supporting trunnion due to the resiliency of the wheel suspension to an extent determined by this resiliency.

In the alternative, the present invention may be achieved by an arrangement, in which spring and shock absorber abut with the lower ends thereof against the lower guide member and with the other ends thereof against a stationary part of the superstructure of the vehicle, body or preferably frame, for example, against a bracket rigidly connected, by means of welding or bolting to a cross member or side beam of the frame. In that case only one part, namely the lower part of the shock-absorber-spring assembly participates in the movement of the wheel suspension in the horizontal direction around the supporting trunnion.

It is understood, however, that the connecting joints of the shock absorber are such as to allow a certain resiliency in the horizontal direction. The best way to obtain this is to provide a joint made of resilient, resistant material, for example, certain artificial resins, as obtained, for example, by polymerization, such as vinyl-polymerizates or artificial rubber, especially natural rubber. Such a joint, however, is not necessary for the spring as the spring is sufficiently resilient in itself.

It is also possible to provide such joints for the connection of the shock absorber to the guide members or to one guide member and to the trunnion or the like in the case where the spring-shock-absorber assembly participates as a whole in the movement of the wheel suspension.

The present invention further consists in that the relatively movable parts of the shock absorber arranged inside the helical spring are connected in such a manner to the supporting members, for example, to the frame, on the one hand, and to one of the guide members of the wheel suspension, on the other, that the shock absorber can be removed independently of the helical spring in the direction of the axis of the spring, particularly in downward direction. This may be achieved by providing a hole greater in diameter than the cross-section of the shock absorber in the parts located below the shock absorber, for example, in the spring plate, and by mounting the shock absorber independently of the spring.

Apart from the possibility of easily removing the shock absorber an advantage of the present invention resides in that the concentric assembly of spring and shock absorber results in a particularly convenient space-saving arrangement. The telescopic type shock absorber can be physically located within the helical spring without requiring additional space and without the need for additional essential parts for the operation thereof which is accomplished directly by the two spring abutments of the helical spring, to which the shock absorber is preferably connected through the intermediary of resilient and resistant members made of, for example, rubber or the like. The total overall height of the springing system and wheel suspension may be kept small even in the application of shock absorbers of comparatively great length by constructing the guide members in a well known manner as bifurcated guide members which include therebetween the spring and the absorber or the supports thereof. To take up the shocks, and particularly those acting in a horizontal direction, it is appropriate to provide a resilient mounting for the supporting trunnion of the guide members and to additionally support the same yieldably, for example, together with the guide members, the spring and the shock absorber.

Further objects, features and advantages of the present invention will become more obvious from the following description when taken in connection with the accompanying drawing which shows for purposes of illustration only several embodiments of the present invention, and wherein.

Figure 1:
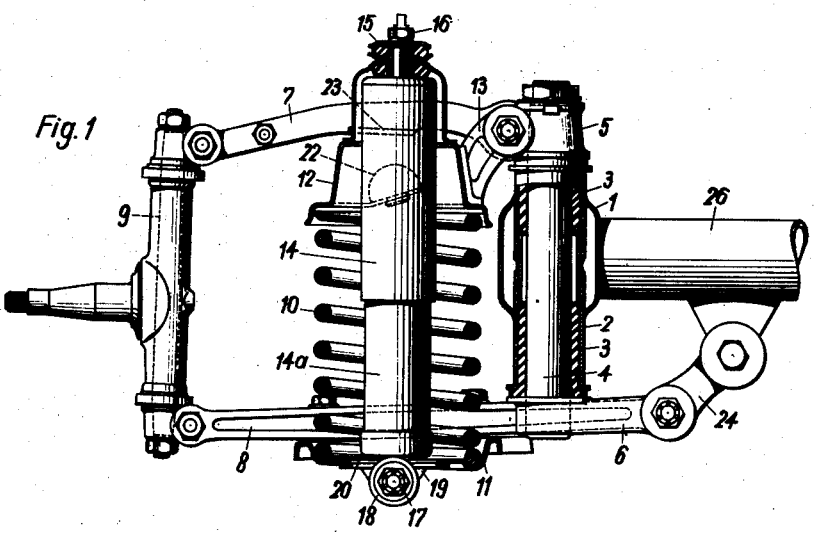
Figure 1 is a cross-sectional view of a spring system provided with a shock-absorber according to the present invention as applied to the front axle of a motor vehicle.
Figure 2:
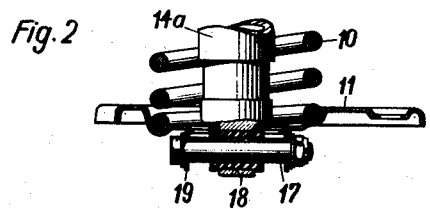
Figure 2 is a longitudinal sectional view through the lower connection of the shock absorber of Figure 1.
Figure 3:
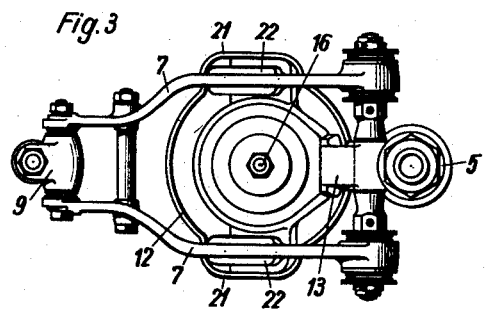
Figure 3 is a top plan view of the upper guide member of Figure 1, partly in section.
Figure 4:
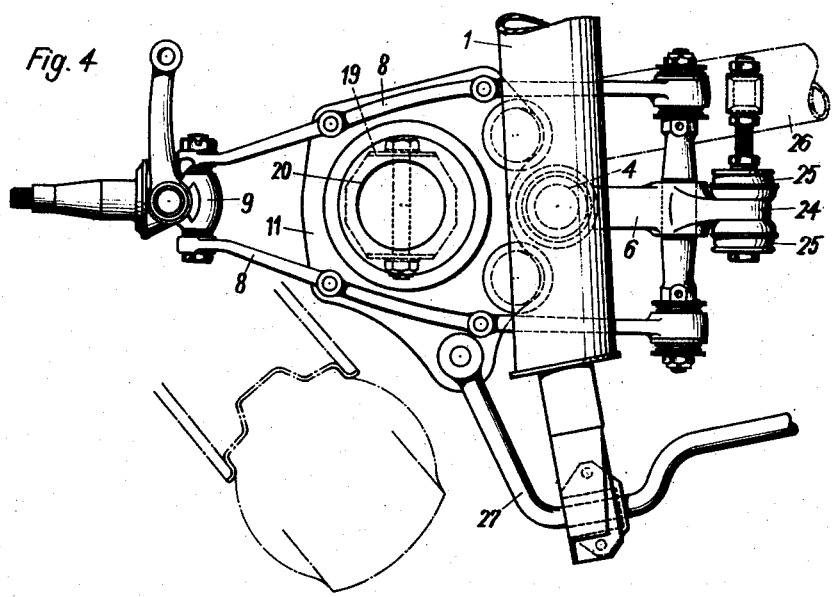
Figure 4 is a plan view of the lower guide member of Figure 1, partly in section.

Referring now to the drawing wherein like reference numerals are used throughout the various views thereof to designate like parts and more particularly to Figure 1, reference numeral 1 designates the frame side member which is traversed by a vertical tubular sleeve 2 in which a supporting trunnion 4 is resiliently mounted by means of rubber bushings or sleeves 3. Secured to each end of the supporting trunnion 4 is a joining member 5 and 6 respectively to which in turn the bifurcated guide members 7 and 8 respectively are pivotally connected to constitute the guide members for the wheel carrier 9. A helical spring 10 is arranged between the guide member 7 and 8, the lower end of which abuts on a spring plate 11 secured to the lower bifurcated guide member 8. The upper end of the spring 10 engages a bell-shaped abutment member 12 which is rigidly connected to the upper joining member 5 on the supporting trunnion 4 by means of a bracket 13. A telescopic type fluid shock absorber 14, 14a is arranged inside the helical spring 10. The upper end of the shock absorber 14 is resiliently bolted as at 16 to the bell-shaped abutment member 12 through the medium of a rubber bearing 15, for example, by providing an axial bolt 16 projecting through a bushing mounted in rubber in the bell-shaped abutment member 12.

The lower end of the shock absorber is pivoted to the spring plate 11 by means of a bolt 17, the articulated connection being also rendered resilient by the use of a rubber bushing 18. An articulate eye lined with a rubber bushing may be provided, for example, at the lower end of the shock absorber 14a which may be held by a hinge bolt 17 provided in the annular spring disc. The bolt 17 is held by a U-shaped web 19 which, like the spring plate 11, is provided with a central hole or aperture 20 greater than the diameter of the shock absorber body 14. After loosening the threaded joint 16 and upon removal of the bolt 17, the shock-absorber 14, 14a can be easily removed by pulling the same downwardly out of the spring 10 without the necessity to remove also the spring.

The swinging motions of the bifurcated guide members 7 and 8 are effectively limited by the shock absorber 14, 14a. In addition thereto, the spring abutment bell 12 is provided with two lateral lugs 21 with rubber cushions 22 attached thereto for engagement with the stop faces 23 provided at the upper forked guide member 7.

The lower joining member 6 is provided with a central lever arm 24 projecting inwardly toward the middle of the vehicle, the end of the lever arm 24 being resiliently supported in the direction of rotation about the supporting trunnion 4 between two rubber bushings or buffers 25. The rubber bearing formed by bushings 25 is adjustably secured to one of the frame cross members 26 and takes up the transverse shocks imparted to the bifurcated guide members 7 and 8 in the horizontal direction.

In addition thereto, a torsion bar stabilizer 27 may also be provided which is pivotally connected to the lower spring plate 11.

Figure 5:
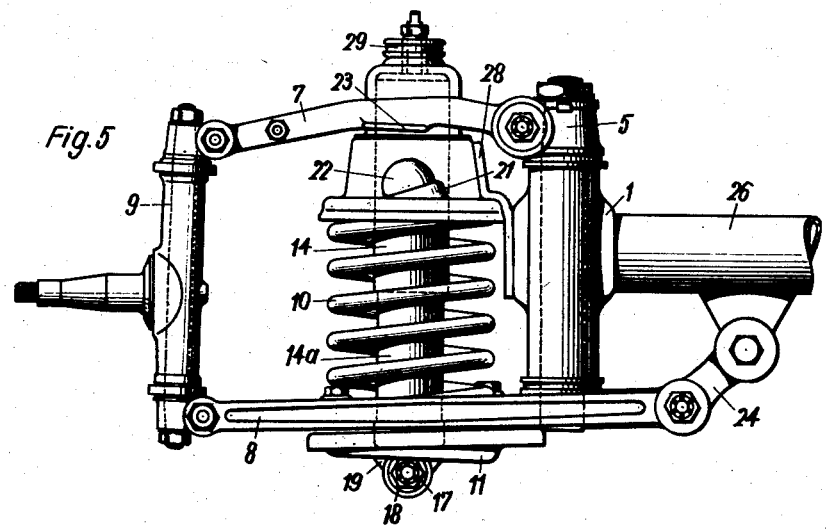
Figure 5 is a view similar to Figure 1 but showing another embodiment where one end each of the spring and the shock absorber abut directly against a superstructure part of the vehicle.

In the embodiment illustrated in Figure 5, the upper end of the helical spring 10 engages and the upper end of the shock absorber 14 is connected to a bell-shaped abutment member 12, similar to Figure 1.

However, instead of being connected to the joining member 5 of the trunnion 4, the bell-shaped abutment member of Figure 5 is directly connected to the frame, for example, to the frame side member 1 by means of a bracket 28 which is rigidly connected to both the abutment member 12 and the frame member. Reference numeral 29 designates a rubber cushion used for fastening the upper end of shock absorber 14 to the bell-shaped abutment member 12. In all other respects the embodiment of Figure 5 is similar to that of Figure 1.

It is understood that instead of helical springs any other annular spring may be used. The shock absorber may be of the hydraulic, pneumatic or any other suitable type.

I claim:

1. A wheel suspension for vehicles comprising a pair of superimposed swinging arms arranged one above the other and acting as guide members for the wheel carrier member of a vehicle wheel and being suspended by means of a helical spring intermediate said arms, a telescopic shock-absorber arranged inside said helical spring and movable axially therewith, a wheel carrier member, joining means connecting one end of each of said swinging arms with said wheel carrier member to provide an oscillating up and down movement, a trunnion with a vertical axis connected to the superstructure of the vehicle, joining members connecting the other ends of said swinging arms to said trunnion to provide vertical oscillating movement, resilient means between the trunnion and the superstructure to resist movement of said trunnion about the vertical axis thereof, a supporting member on the trunnion, the lower end of said spring abutting against the lower swinging arm and the upper end thereof against said supporting member, resilient means between the upper end of said telescopic shock absorber and said supporting member, and resilient means between the lower end of said shock absorber and said lower swinging arm.

2. A wheel suspension for vehicles comprising a chassis, a vehicle wheel, a wheel carrier member, at least one guide link member, means connecting the outer end of said guide link member with the wheel carrier member, means connecting the inner end of the guide link member with the chassis, a first bearing part connected to the chassis, a second bearing part on said guide link member, a helical spring arranged substantially vertically between the two bearing parts, the upper end of said spring being supported on said first bearing part and the lower end on said second bearing part, a telescopic shock absorber arranged within the helical spring, means articulately connecting the upper end of said shock absorber with said first bearing part, means connecting the lower end of said shock absorber with said second bearing part, said second bearing part being provided with an opening for said shock absorber of such a width as to allow said shock absorber to be axially removed through said opening, said last-named means comprising a pair of flanges on both sides of said opening and spaced from each other to permit the removal of said shock absorber therebetween, a swivel eye on said shock absorber, and a pin extending through said eye and articulately connecting said eye to said flanges.

3. A wheel suspension for vehicles comprising a chassis, a vehicle wheel, a wheel carrier member, an upper guide link member, a lower guide link member, means articulately connecting the outer ends of said two aforementioned guide link members with said wheel carrier member, means articulately connecting the inner end of said lower guide member with said chassis, a bearing part detachably fastened to said chassis, means articulately connecting the inner end of said upper guide member to said bearing part, a plate-shaped supporting member on said lower guide member, a helical spring arranged between said two guide members, the lower end of said spring being supported on said plate-shaped supporting member and the upper end thereof on said bearing part, a telescopic shock absorber arranged within the helical spring, means articulately connecting the upper end of said shock absorber with said first bearing part, means connecting the lower end of said shock absorber with said supporting member, said supporting member being provided with an opening for said shock absorber of such a width as to allow said shock absorber to be axially removed through said opening, said last-named means comprising a pair of flanges on both sides of said opening and spaced from each other to permit the removal of said shock absorber therebetween, a swivel eye on said shock absorber, and a pin extending through said eye and articulately connecting said eye to said flanges.

4. The combination according to claim 2, wherein said swivel eye on said shock absorber loosely surrounds said pin, and further comprising elastic means intermediate said pin and said swivel eye.

5. The combination according to claim 2, wherein said flanges are directed downwardly from said second bearing part.

6. The combination according to claim 2, wherein said flanges are directed downwardly from said second bearing part, and said swivel eye on said shock absorber surrounds the pin with play, and further comprising elastic means intermediate said pin and said swivel eye.

7. A wheel suspension for vehicles comprising a chassis, a vehicle wheel, a wheel carrier member, an upper guide link member, a lower guide link member, means articulately connecting the outer ends of the two aforementioned guide link members with said wheel carrier member, means articulately connecting the inner end of said lower guide member with said chassis, a bearing part detachably fastened to said chassis, means articulately connecting the inner end of said upper guide member to said bearing part, a plate-shaped supporting member on said lower guide member, a helical spring arranged between said two guide members, the lower end of said spring being supported on said plate-shaped supporting member and the upper end thereof on said bearing part, a telescopic shock-absorber arranged within said helical spring, means articulately connecting the lower end of said shock absorber with said plate-shaped supporting member, means articulately connecting the upper end thereof with said bearing part, said means articulately connecting said lower end of the shock absorber with said plate-shaped supporting member comprising a pair of flanges on said supporting member on both sides of the axis of the shock absorber, a pin supported in said two flanges, a swivel eye on said shock absorber surrounding said pin with play, and elastic means intermediate said pin and said swivel eye, said flanges on the supporting member being directed downwardly, and the supporting member being provided with an opening through which the shock absorber can be axially removed after loosening said pin, said flanges being spaced from each other to permit the removal of the shock absorber therebetween.

8. A wheel suspension for vehicles comprising a pair of superimposed swinging arms arranged one above the other and acting as guide members for the wheel of the vehicle and being suspended by means of a helical spring intermediate said arms, a telescopic shock-absorber arranged inside said helical spring and movable axially therewith, a trunnion with a vertical axis connected to the superstructure of the vehicle, wheel carrying means, joining means connecting said wheel carrying means to one end of said arms, joining means connecting the other end of said arms to said trunnion to provide vertical oscillating movement of the wheel, resilient means between said trunnion and said superstructure to resist movement of said trunnion about its vertical axis, a supporting member on the trunnion, the lower end of said spring abutting against said lower swinging arm and the upper end thereof against said supporting member, said telescopic shock absorber supported with the upper end thereof against said supporting member, and resilient means between the lower end of said shock absorber and said lower swinging arm, said lower swinging arm having a spring-supporting plate with an opening therein, and means including said resilient means articulately connecting said shock absorber to said plate to provide removal of said shock absorber through said opening after loosening said articulately connecting means.

9. In a vehicle, a chassis, a vehicle wheel, wheel carrier means, a pair of superimposed bifurcated guide members, means connecting one end of each of said members to said wheel carrier means, a trunnion with a vertical axis connected to said chassis, means connecting the other end of each of said guide members to said trunnion, a helical spring intermediate said guide members, a bell-shaped member mounted on said trunnion and supporting the upper end of said helical spring, a bottom plate on the lower one of said guide members, a telescopic shock absorber with an extension, said shock absorber being enclosed by said spring and located between said bell-shaped member and said bottom plate, an opening in said bottom plate to receive said extension, means supporting said shock absorber against said bell-shaped member within the latter, and means supporting said shock absorber with the extension thereof against the bottom side of said bottom plate.

References Cited in the file of this patent

UNITED STATES PATENTS

| | | |
|---|---|---|
| 2,070,817 | Wagner | Feb. 16, 1937 |
| 2,159,203 | Chayne | May 23, 1939 |
| 2,190,298 | Slack | Feb. 13, 1940 |
| 2,305,802 | Balz | Dec. 22, 1942 |
| 2,314,505 | McIntyre et al. | Mar. 23, 1943 |
| 2,321,832 | Leighton | June 15, 1943 |
| 2,334,597 | Badertscher | Nov. 16, 1943 |
| 2,338,478 | Wulff | Jan. 4, 1944 |
| 2,351,651 | Wulff | June 20, 1944 |
| 2,507,108 | Lange | May 9, 1950 |